2,868,681
FREE-PEELING SUBMERGED ARC WELDING COMPOSITION

Arthur E. Shrubsall, Niagara Falls, N. Y., and Clarence E. Jackson, Berkeley Heights, N. J., assignors to Union Carbide Corporation, a corporation of New York No Drawing. Application September 16, 1957
Serial No. 683,958

3 Claims. (Cl. 148—26)

This invention relates to submerged electric arc welding and more particularly to an improved welding composition therefor.

A serious hazard exists in submerged arc welding when certain alloying constituents, particularly chromium, are present in the workpiece to be welded or in the welding rod. Slivers of glass-like material tightly adhere to the surface of the weld deposit when the main body of the fused welding composition has solidified and has been removed. Upon further cooling and full contraction of the weld metal, such slivers tend to fly in many directions and expose the operator of the welding apparatus to the possibility of serious injury.

The exact nature of such slivers has not been established, but we believe they are related to the formation of silicates at the interface between the weld metal and the solidifying fused welding composition. A welding composition was, therefore, sought by us which would free itself cleanly from the weld deposit and which would not contain any constituents that could combine with constituents of the weld metal to form these tightly adhering glass-like particles.

Such a welding composition is provided, according to this invention, in the form of a highly basic material consisting essentially of lime and alumina. The composition preferably comprises 42% lime, 48% alumina, and 10% fluorspar ($CaF_2$). Although it is preferred that no silica be present in the composition, this is extremely difficult to achieve. Accordingly, silica is tolerable up to 5% only since more than such quantity has a tendency to shift the welding composition toward the acid side and thus creates a condition favoring the formation of glass. The broad range of the constituents in the welding composition of the invention is as follows:

| | |
|---|---|
| CaO | 40–45%. |
| $Al_2O_3$ | 45–55%. |
| $CaF_2$ | 2–15%. |
| Others | 5% maximum. |

Typical example

A submerged arc weld corroborating the usefulness of the welding composition of the invention was made wherein a material having the following composition was employed.

| | Percent |
|---|---|
| CaO | 40.97 |
| $Al_2O_3$ | 50.83 |
| $CaF_2$ | 6.87 |
| $SiO_2$ | 1.33 |
| FeO | 0.42 |

A butt weld was made on ½-inch thick Type 347 stainless steel using a ¼-inch diameter electrode of similar material. The weld was made at 810 amperes, 30 volts, A. C., at a speed of 18 inches per minute. An acceptable weld with a smooth surface was achieved. The fused welding composition peeled freely from the deposited weld metal, and there were no adhered slivers. Analyses of the weld metal and fused welding composition are as follows:

| Weld metal: | Percent |
|---|---|
| C | 0.077 |
| Mn | 1.89 |
| Si | 0.63 |
| Cr | 18.96 |
| Ni | 11.55 |
| Cb | 0.86 |
| N | 0.078 |
| Fe | Balance |

| Fused welding composition: | |
|---|---|
| CaO | 42.99 |
| $Al_2O_3$ | 47.30 |
| $CaF_2$ | 3.36 |
| $SiO_2$ | 3.56 |
| $Cr_2O_3$ | 0.62 |
| $Cb_2O_3$ | 1.0 |
| FeO, etc. | 0.65 |

The welding composition of the invention does not tightly adhere to the surface of the weld deposit when certain alloying constituents, such as chromium, are present. The presence of these glass-like slivers, and the unpredictable explosive manner in which they tend to release from the weld surface upon cooling, has for some time represented a potential hazard to the welding operator.

On the novel theory that a highly basic composition would serve the purpose of eliminating sliver formation, since they were thought to be silicate forms of alloying components, the present welding composition was obtained. The constituents include approximately 42% lime, 48% alumina, the balance fluorspar. When this welding composition is employed in submerged arc welding, it is exceptionally free-peeling, no material adheres to the weld surface, and acceptable, clean welds are produced.

What is claimed is:

1. A submerged arc welding composition which inhibits the formation of slivers that adhere to the weld deposit when the main body of the solidified fused welding composition has been removed, and which consists of 40% to 45% CaO, 45% to 55% $Al_2O_3$, 2% to 15% $CaF_2$, and the remainder up to 5% incidental impurities including silica.

2. A submerged arc welding composition for the purpose set forth, that is composed of the following constituents:

| | |
|---|---|
| CaO | 40–45%. |
| $Al_2O_3$ | 45–55%. |
| $CaF_2$ | 2–15%. |
| Silica and other impurities | 5% maximum. |

3. A submerged arc welding composition for the purpose set forth, that is composed of 48% alumina, 42% lime, and 10% fluorspar.

References Cited in the file of this patent
UNITED STATES PATENTS 2,694,023   Hopkins _____ Apr. 8, 1950